(12) United States Patent
Lakshman et al.

(10) Patent No.: US 9,830,682 B2
(45) Date of Patent: Nov. 28, 2017

(54) UPSAMPLING AND SIGNAL ENHANCEMENT

(71) Applicant: Fraunhofer-Gesellschaft zur Foerderung der angewandten Forschung e.V., Munich (DE)

(72) Inventors: Haricharan Lakshman, Berlin (DE); Heiko Schwarz, Panketal (DE); Detlev Marpe, Berlin (DE); Thomas Wiegand, Berlin (DE); Gitta Kutyniok, Berlin (DE); Lim Wang-Q, Osnabrueck (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/922,797

(22) Filed: Oct. 26, 2015

(65) Prior Publication Data

US 2016/0048947 A1 Feb. 18, 2016

Related U.S. Application Data

(63) Continuation of application No. PCT/EP2014/058267, filed on Apr. 23, 2014.

(30) Foreign Application Priority Data

Apr. 26, 2013 (EP) .................................. 13165601

(51) Int. Cl.
*G06K 9/36* (2006.01)
*G06T 3/40* (2006.01)

(52) U.S. Cl.
CPC .......... *G06T 3/4053* (2013.01); *G06T 3/4076* (2013.01); *G06T 2207/20024* (2013.01)

(58) Field of Classification Search
CPC ................. G06T 3/4053; G06T 3/4076; G06T 2207/20024
See application file for complete search history.

(56) References Cited

U.S. PATENT DOCUMENTS

| 7,401,006 B2 | 7/2008 | Pinnegar et al. |
| 7,526,123 B2 | 4/2009 | Moon et al. |

(Continued)

FOREIGN PATENT DOCUMENTS

| EP | 0677820 A2 | 10/1995 |
| EP | 0677821 A2 | 10/1995 |

(Continued)

OTHER PUBLICATIONS

Ma, Xiang, et al. "Sparse representation and position prior based face hallucination upon classified over-complete dictionaries." Signal processing 92.9 (2012): 2066-2074.*

(Continued)

*Primary Examiner* — Jonathan S Lee
(74) *Attorney, Agent, or Firm* — Perkins Coie LLP; Michael A. Glenn

(57) ABSTRACT

A signal which is to be quality-improved often suffers from the quality degradation in the spatial high frequency region more than compared to the spatial low frequency region. Accordingly a quality improvement is performed efficiently by combining the signal to be quality improved with a high frequency portion extracted from a sparse approximation of the signal to be quality improved.

26 Claims, 7 Drawing Sheets

(56) References Cited

U.S. PATENT DOCUMENTS

| | | | |
|---|---|---|---|
| 8,165,215 | B2 | 4/2012 | Elad et al. |
| 8,233,734 | B2 | 7/2012 | Zhang et al. |
| 8,260,087 | B2 | 9/2012 | Messing et al. |
| 8,290,251 | B2 | 10/2012 | Mahajan et al. |
| 8,369,653 | B1 | 2/2013 | Cohen et al. |
| 8,743,963 | B2* | 6/2014 | Kanumuri ............ G06T 3/4053 375/240.02 |
| 2005/0105817 | A1 | 5/2005 | Guleryuz et al. |
| 2011/0216210 | A1* | 9/2011 | Hao ................... H04N 5/23248 348/222.1 |
| 2012/0185524 | A1* | 7/2012 | Clark ................ H03H 17/0223 708/313 |

FOREIGN PATENT DOCUMENTS

| | | |
|---|---|---|
| EP | 1018705 A2 | 7/2000 |
| JP | 2005235169 A | 9/2005 |

OTHER PUBLICATIONS

Mu, Guangwu, et al. "Single image super resolution with high resolution dictionary." 2011 18th IEEE International Conference on Image Processing. IEEE, 2011.*

Nath, Aneesh G., Madhu S. Nair, and Jeny Rajan. "Single Image Super Resolution from Compressive Samples Using Two Level Sparsity Based Reconstruction." Procedia Computer Science 46 (2015): 1643-1652.*

Yang, Jianchao, et al. "Image super-resolution via sparse representation." IEEE transactions on image processing 19.11 (2010): 2861-2873.*

Yang, Jianchao, et al. "Image super-resolution as sparse representation of raw image patches." Computer Vision and Pattern Recognition, 2008. CVPR 2008. IEEE Conference on. IEEE, 2008.*

Yang, Jianchao et al., "Image Super-Resolution Via Sparse Representation", IEEE Transactions on Image Processing, IEEE, NJ, US, vol. 19, No. 11, Nov. 1, 2011, Jianchao Yang, Student Member, IEEE, John Wright, Member, IEEE, THomas S. Huang, Fellow, IEEE, and Yi Ma, Senior Member, IEEE XP011328631, the whole document, Nov. 1, 2011, 2861-2873.

Aharon, M et al., "The K-SVD: An Algorithm for Designing of Overcomplete Dictionaries for Sparse Representation", IEEE Trans. On Signal Proc., vol. 54, No. 11, pp. 4311-4322, Nov. 2006.

Blu, T et al., "MOMS: Maximal-Order Interpolation of Minimal Support", IEEE Trans. On Image Proc., vol. 10, No. 7, Jul. 2001.

Blumensath, T et al., "Iterative Thresholding for Sparse Approximations", The Journal of Fourier Analysis and Applications, vol. 14, No. 5, Dec. 2008, pp. 629-654.

Candes, E.J. et al., "New tight frames of curvelets and optimal representations of objects with C2 singularities", Comm. Pure Appl. Math., vol. 57, No. 2, 2004, pp. 219-266.

Chen, S.S. et al., "Atomic Decomposition by Basis Pursuit", SIAM Journal on Scientific Computing, vol. 20, No. 1, 1998, vol. 1.

Do, M.N. et al., "The contourlet transform: an efficient directinoal multiresolution image representation", IEEE Trans. on Image Proc., vol. 14, No. 12, Dec. 2005.

Dugad, R. et al., "A Fast Scheme for Downsampling and Upsampling in the DCT Domain", Image Processing, Proceedings, 1999 International Conference On—Kobe, Japan, vol. 2, Oct. 24, 1999, pp. 909-913.

Fu, K.S., "A Survey on Image Segmentation", School of Electrical Engineering, Purdue University, Jun. 3, 1980, pp. 3-16.

Hashigami, Hidenobu, "Method for Expanding Images with Estimation of High-Frequency Components Using Similarity of Images", Image Library, Japan Industrial Publishing Co., Ltd. vol. 24, No. 4., Apr. 10, 2013, pp. 23-28.

Irani, M et al., "Improving resolution by image registration", Graphical Models and Image Processing, 53, 1991, 231-239.

Kutyniok, G et al., "Compactly Supported Shearlets are Optimally Sparse", J. Approx. Theory, vol. 163, 2011, pp. 1564-1589.

Li, X et al., "New edge-directed interpolation", ISSS Trans. on Image Proc., 10 (10), 2001, 1521-1527.

Mairal, Julien, "Discriminative Sparse Image Models for Class-Specific Edge Detection and Image Interpretation", Oct. 12, 2008, Computer Vision, ECCV 2008; Springer, XP019109283, p. 50, paragraph 1-p. 51, paragraph 3 p. 52, paragraph 2-p. 55, paragraph 3; figure 5, Oct. 12, 2008, 43-59.

Mallat, S. G., "Matching pursuits with time-frequency dictionaries", IEEE Trans. On. Signal Proc., vol. 41, No. 12., Dec. 1993, pp. 3397-3415.

Olhausen, B A et al., "Natural image statistics and efficient coding", Network: Computation in Neural Systems, IOP Publishing, Bristol, GB, vol. 7, No. 2, May 1, 1996., XP020060801, May 1, 1996, 333-339.

Shannon, C.E., "Communication in the presence of noise", Proc. Institute of Radio Engineers, vol. 37, No. 1, Jan. 1949, pp. 10-21.

Shinbori, E et al., "High-Quality Image Magnification Applying the Gerchberg-Papoulis Iterative Algorithm with DCT", Systems & Computers in Japan, Wiley, Hoboken, NJ, US, vol. 25, No. 6, Jun. 1, 1994, XP000476903, the whole document, Jun. 1, 1994, 80-90.

Unser, M, "Sampling—50 Years After Shannon", Proc. IEEE vol. 88, No. 4, Apr. 2000, pp. 569-587.

Unser, M, "Splines: A Perfect Fit for Signal and Image Processing", IEEE Signal Proc. Magazine, vol. 16, No. 6, Nov. 1999, pp. 22-28.

Yang, Jianchao et al., "Image Super-Resolution Via Sparse Representation", IEEE Transactions on Image Processing, IEEE, NJ, US, vol. 19, No. 11, Nov. 1, 2011, Jianchao Yang, Student Member, IEEE, John Wright, Member, IEEE, THomas S. Huang, Fellow, IEEE, and Yi Ma, Senior Member, IEEE, XP011328631, the whole document, Nov. 1, 2011, 2861-2873.

* cited by examiner

UPSAMPLING AND SIGNAL ENHANCEMENT

CROSS-REFERENCE TO RELATED APPLICATIONS

This application is a continuation of copending International Application No. PCT/EP2014/058267, filed Apr. 23, 2014, which is incorporated herein by reference in its entirety, and additionally claims priority from European Application No. 13165601.9, filed Apr. 26, 2013, which is also incorporated herein by reference in its entirety.

BACKGROUND OF THE INVENTION

The present application is concerned with upsampling and signal enhancement such as in the field of image/video coding.

Image upsampling refers to generating a High Resolution (HR) image from an input Low Resolution (LR) image. This task has regained attention because images/videos are being viewed on displays of varying sizes, like mobile phones, tablets, laptops, PCs, etc. For example, the content for a 1920×1080 display may be available only in a 1280×720 format and needs to be upsampled. More recently, 4K displays are becoming popular and content with a lower resolution (e.g., 1920×1080) may have to be displayed.

Image upsampling is also referred to as image interpolation, upscaling, resizing, resampling, super-resolution, etc. Many established methods are available for achieving upsampling, e.g., FIR filtering using bilinear filter (2-tap) or bicubic filter (4-tap) is popularly employed due to the ease of implementation. These techniques may cause several artifacts, most commonly, blurring of the resulting HR image. The main purpose of this invention is to recover sharp edges and textures, while reducing blurring, ringing, aliasing or other visual artifacts. For videos, there is an additional requirement to maintain the temporal coherence and to avoid picture-to-picture flickering during playback.

Image/video upsampling finds many applications in image processing, computer vision and graphics, such as compression, editing, surveillance, and texture mapping. It is vital for image browsing and video playback software. Details synthesis in image upsampling can also be used as a tool for scalable video coding. Details synthesis can also be used without upsampling, e.g., as a loop filter or post filter stage in a video coding context.

Signal processing theory for band-limited signals advocates sampling higher than the Nyquist rate and a sinc interpolation [Shannon1949, Unser2000]. The assumption of band-limitedness does not hold for most images, due to the existence of sharp edges. However, conventional schemes adhere to this philosophy and approximate the ideal low pass filter to produce acceptable results for many practical applications. Techniques like bilinear, bi-cubic interpolation, etc., are some popular examples that have low computational complexity. Extending the sampling theory to shift-invariant spaces without bandlimit constraints has led to a generalized interpolation framework, e.g., B-spline [Unser1999], MOMS interpolation [Blu2001] that provide improvements in image quality for a given support of basis functions. However, these linear models cannot capture the fast evolving statistics around edges. Increasing the degree of basis functions in these linear models help to capture higher order statistics but result in longer effective support in the spatial domain and hence produce artifacts like ringing around edges.

To improve linear models, directional interpolation schemes have been proposed that perform interpolation along the edge directions, e.g., NEDI [Li2001]. It is achieved through computing local covariances in the input image and using them to adapt the interpolation at high resolution, so that the support of the interpolator is along the edges. However, the resulting images still show some artifacts. The iterative back-projection [Irani1991] technique improves image interpolation when the downsampling process is known. Its basic idea is that the reconstructed HR image from the LR image should produce the same observed LR image if passing it through the same blurring and downsampling process. However, the downsampling filter may not be known in many cases, or the input image may be camera captured, where the optical anti-alias filter used within the sampling system is not known during the subsequent image processing stages. Therefore, it is desirable to design a method that does not rely directly on the downsampling process.

Upsampling an image is one form of image enhancement. Image enhancement aims at improving the quality of an image. In other words, image enhancement aims at reversing, at least partially, the quality degradation an image may have been subject to by, for example, lossy coding.

SUMMARY

According to an embodiment, an apparatus for upsampling a first signal having a first resolution may have: an upsampler configured to apply an upsampling process onto the first signal so as to obtain a second signal having a second resolution higher than the first resolution; a sparsity enforcer configured to generate, using sparse approximation, an approximated signal having the second resolution; a high frequency portion extractor configured to extract a high frequency portion from the approximated signal wherein the high frequency portion extractor is a high pass filter or is configured to extract the high frequency portion from the approximated signal by estimating a low frequency portion of the approximated signal and subtracting the low frequency portion from the approximated signal; and a combiner configured to combine the second signal and the extracted high frequency portion.

According to another embodiment, an apparatus for enhancing an input signal may have: a sparsity enforcer configured to generate, using sparse approximation, an approximated signal approximating the input signal; a high frequency portion extractor configured to extract a high frequency portion from the approximated signal wherein the high frequency portion extractor is a high pass filter or is configured to extract the high frequency portion from the approximated signal by estimating a low frequency portion of the approximated signal and subtracting the low frequency portion from the approximated signal; and a combiner configured to combine the input signal and the extracted high frequency portion from approximated signal.

According to another embodiment, a method for upsampling a first signal having a first resolution may have the steps of: applying an upsampling process onto the first signal so as to obtain a second signal having a second resolution higher than the first resolution; generating, using sparse approximation, an approximated signal having the second resolution; extracting a high frequency portion from the approximated signal using a high pass filter or by estimating a low frequency portion of the approximated signal and subtracting the low frequency portion from the approximated signal; and combining the second signal and the extracted high frequency portion.

According to another embodiment, a method for enhancing an input signal may have the steps of: generating, using sparse approximation, an approximated signal approximating the input signal; extracting a high frequency portion from the approximated signal using a high pass filter or by estimating a low frequency portion of the approximated signal and subtracting the low frequency portion from the approximated signal; and combining the input signal and the extracted high frequency portion from approximated signal.

Another embodiment may have a computer program or computer program product for performing, when executed on a computer, the above methods.

The present application exploits the inventors' finding that a signal which is to be quality-improved often suffers from the quality degradation at high frequencies more than compared to low frequencies, and that accordingly a quality improvement is performed most efficiently by combining the signal to be quality improved with a high frequency portion extracted from a sparse approximation for the signal to be quality improved. In accordance with one aspect of the present application, for example, the finding is exploited for upsampling a first signal wherein an initial upsampling process is applied onto the first signal so as to obtain a second signal having a resolution higher than the first signal's resolution. Here, the upsampling process tends to show lower quality for higher frequencies than compared to lower frequencies. In accordance with another aspect of the present application, the above outlined idea as used for signal enhancement may have been quality-degraded by way of, for example, lossy coding. In fact, the concept of signal enhancement of the present application may be seen as part of the upsampling concept of the present application, with the signal enhancement being applied onto the upsample result.

BRIEF DESCRIPTION OF THE DRAWINGS

Embodiments of the present application are described in more detail below with respect to the figures, among which.

DETAILED DESCRIPTION OF THE INVENTION

Before the description of certain embodiments of the present application, some thoughts shall be outlined which led to the subsequently described embodiments.

First of all, it is noted that linear models like FIR filter based interpolation are faithful in interpolating the low frequency components, but distort the high frequency components in the upsampled image. Accordingly, in the embodiments outlined below, the output of such an initial interpolator is combined with detail components from a sparse approximation. For example, this may be realized by way of an iterative framework that performs the combination. The motivation to use the detailed components from a sparse approximation for signal enhancement is motivated by the fact that natural images can be sparsely represented in some domains [Olshausen1996]. The stage of sparse approximation can be viewed as approximating a signal with only a few transform coefficients, e.g. by transforming the signal to a specific domain, setting the transform coefficients below a certain amplitude to zero and inverse transforming the coefficients to get back an approximation. The domain used for transforming can be, for instance, discrete cosine transform (DCT), or multi-resolution representation using wavelets, or multi-resolution directional representation using curvelets, contourlets, shearlets, etc., or other fixed or training-based dictionaries. Reference is made to the descriptions set out below.

That is, instead of explicitly detecting the directions of interpolation, the embodiments outlined below use sparse approximation. For example, iterative thresholding of directional transform coefficients produces a sharper image along dominant edges/directions.

Figure 1:
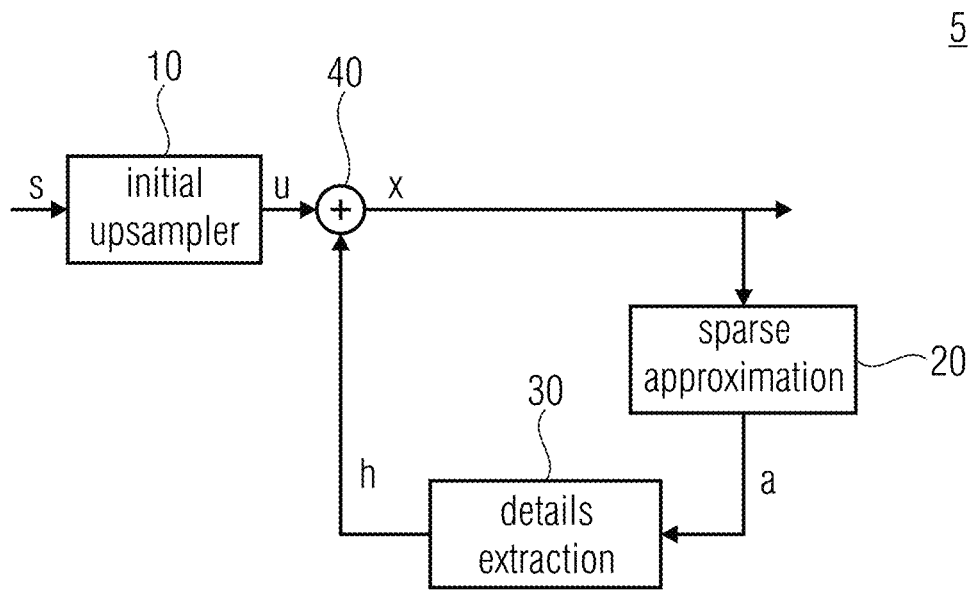
FIG. 1 shows a block diagram of an apparatus for upsampling a signal to be upsampled in accordance with an embodiment.

FIG. 1 shows an apparatus 5 for upsampling a first signal s having a first resolution, wherein the apparatus 5 comprises an upsampler 10, a sparsity enforcer 20, a high frequency portion extractor 30 and a combiner 40. The upsampler 10 receives the first signal s and is configured to apply an upsampling process onto the first signal so as to obtain a second signal having a second resolution higher than the first resolution. Combiner 40 has a first input connected to the upsampler's 10 output, and combiner 40, sparsity enforcer 20 and high frequency portion extractor 30 are serially connected to each other in the order of their mentioning so as to form a loop between combiner's 40 output and a second input of combiner 40, respectively. The output of combiner 40 concurrently forms the output of apparatus 5.

In particular, at the beginning the high frequency portion h extracted from the approximated signal a by high frequency portion extractor 30, may be set such that the second signal u passes combiner 40 unmodified, i.e. the signal at the combiner's output 40, i.e. x, equals u. The sparsity enforcer 20 is configured to generate, using sparse approximation, an approximated signal a having the second resolution and approximating the inbound signal x. The high frequency portion extractor 30 extracts a high frequency portion h from the approximated signal a, which is then combined by combiner 40 with the second signal u so as to result in an enhanced/upsampled upsampled signal x.

The mode of operation, the advantages and the thoughts underlying the apparatus 5 of FIG. 1 are described in more detail below. It is noted however, that the signal to be upsampled, i.e. s, may be any type of signal. For example, signal s may be a video or a picture, i.e. may two-dimensionally spatially sample a scene with the apparatus 5 increasing the spatial resolution of the signal s. However, alternatively, signal s may be a one-dimensional signal spatially or temporally sampling, for example, a certain physical property. For example, signal s may be the output signal of a profilometer and spatially sample a surface profile. For the time being, the embodiment of FIG. 1 is described for a 1D signal. For image upsampling, the description brought forward below can be, for example, extended to 2D using row-wise and column-wise operations or realized directly using 2D operations on image samples. Details synthesis as performed by apparatus 5 can be done either on an entire image or block- or region-wise.

Consider an input LR signal of dimension N×1 represented as a vector $s \in R^N$. The final goal is to generate an output HR signal of dimension M×1, where M>N.

The upsampler 10 receives the input LR signal and performs an initial upsampling of $s \in R^N$ to produce a signal $u \in R^M$, e.g., using an FIR filter based interpolation.

Thus, the upsampler 10 forms a first stage of the apparatus' 5 processing.

As an example, let a column of an LR image be composed of four samples, denoted by $s=[a\ b\ c\ d]^T$. Consider the task of doubling the number of samples. Assume that the samples beyond the specified image border are obtained by repeating the last available sample. Other kinds of boundary extensions are also possible.

If a new sample $x_1$ needs to be produced in the middle of samples b and c, the coefficients of the bicubic filter are: [−1, 9, 9, −1]/16, i.e., $x_1=(-a+9b+9c-d)/16$. Extending this to other samples gives rise to a vector expression $u=U \cdot s$, where U is called as an upsampling matrix.

$$\begin{pmatrix} a \\ x_0 \\ b \\ x_1 \\ c \\ x_2 \\ d \\ x_3 \end{pmatrix} = \frac{1}{16} \begin{pmatrix} 0 & 16 & 0 & 0 & 0 & 0 & 0 \\ -1 & 9 & 9 & -1 & 0 & 0 & 0 \\ 0 & 0 & 16 & 0 & 0 & 0 & 0 \\ 0 & -1 & 9 & 9 & -1 & 0 & 0 \\ 0 & 0 & 0 & 16 & 0 & 0 & 0 \\ 0 & 0 & -1 & 9 & 9 & -1 & 0 \\ 0 & 0 & 0 & 0 & 16 & 0 & 0 \\ 0 & 0 & 0 & -1 & 9 & 9 & -1 \end{pmatrix} \begin{pmatrix} a \\ a \\ b \\ c \\ d \\ d \\ d \end{pmatrix}$$

Other forms of initial approximation can also be employed, e.g. using B-splines or non-linear techniques. In order to keep the complexity of the initial upsampling low and at the same time achieve a good quality of the initial upsampled image, 6-tap or 8-tap FIR filters may be of advantage.

Summarizing the notes concerning the upsampler 10 provided so far, the upsampler 10 may accordingly be configured to perform the initial upsampling process using an FIR filter, an IIR filter, or a combination of both.

In the embodiment of FIG. 1, sparsity enforcer 20, high frequency portion extractor 30 and combiner 40 act together in order to perform an iterative refinement of the signal x output by apparatus 5. That is, the quality of signal x steadily increases from one iteration to the next. The details thereabout are described further below.

In the iterative procedure the initial upsampled signal u is combined with an estimated refinement signal $h^{(i)} \in R^M$, where i represents an iteration number, to produce a refined signal $x^{(i)} \in R^M$, i.e.

$$x^{(i)} = u + h^{(i)}.$$

For the first iteration, the refinement signal $h^{(0)}$ is initialized to zero, therefore $x^{(0)}=u$. Then, a sparsity enforcing step is operated on $x^{(i)}$ by sparsity enforcer 20 to produce an approximated signal $a^{(i)}$. Next, the high frequency details of $a^{(i)}$ denoted as $h^{(i+1)}$ are extracted by high frequency portion extractor 30 and used by combiner 40 to update the estimated HR signal to produce $x^{(i+1)}$. The procedure is repeated for a certain number of iterations and the samples in $x^{(i+1)}$ after the last stage form the output HR image. Summarizing the iterative refinement, we have, $$x^{(i)} \to a^{(i)} \to h^{(i+1)} \to x^{(i+1)}.$$

That is, the sparsity enforcer 20, the high frequency portion extractor 30 and the combiner 40 are configured to perform the generation, the extraction and the combination iteratively in iterations with the sparsity enforcer 20 applying the sparse approximation onto a combined signal x obtained by the combination performed by the combiner 40.

It should be noted that combiner 40 is exemplarily implemented as an addition between upsample signal u and current refinement signal h, wherein the latter is initially, i.e. at the beginning of the first iteration, set to equal the neutral element. Alternatively, another form of a combination may be used by combiner 40 such as, for example, a multiplication in which case the signal h would, for example, in the beginning of the first iteration set to be equal the neutral element, i.e. 1.

Sparse approximation as performed by sparsity enforcer 20 is a term used to refer to an approximation that accounts for most of the signal with a linear combination of a small number of elementary signals called atoms. The elementary signals can be composed of basis functions like DCT, DFT, Wavelets, or over-complete functions like Contourlets, Shearlets, etc.

There are several methods to perform sparse approximations, for instance,

Forward transform, Thresholding, Inverse transform (Iterative thresholding [Blumensath2008])

Optimizing a cost function with regularization (L0 minimization, L1 minimization, Basis Pursuit [Chen1998])

Successively building up the signal approximation one coefficient at a time (Matching Pursuit [Mallat1993], Orthogonal Matching Pursuit)

Here, a short introduction to signal expansion is provided first and then an embodiment for sparse approximation, a thresholding scheme, is described.

Consider a matrix B of dimension M×P, whose columns are $\{b_0, b_1, b_2, \ldots, b_{P-1}\}$. The matrix B is also called as a dictionary. In case of DCT, $\{b_0, b_1, b_2, \ldots, b_{P-1}\}$ are cosine functions at different frequencies. As defined earlier, the signal $x^{(i)}$ has a dimension of M×1. Each of the vectors $b_i$ also has a dimension of M×1 and there are P such vectors in the dictionary B.

The task of the so-called signal expansion is to represent a signal x in terms of the vectors $b_i$, i.e.

$$x = w_0 * b_0 + w_1 * b_1 + w_2 * b_2 + \ldots + w_{P-1} * b_{P-1},$$

where, $\{w_0, w_1, w_2 \ldots w_{P-1}\}$ are called as weights or transform coefficients.

This can be compactly written as, $$x = B \cdot w,$$

where, $w = [w_0, w_1, w_2 \ldots w_{P-1}]^T$.

If P<M, the dictionary cannot represent certain vectors of dimension of M×1. If P=M and the vectors $b_i$ are chosen such that they are linearly independent, then they are called basis vectors and can represent any x of dimension of M×1, e.g., B is composed of DCT or DFT basis. If P>M, the dictionary is said to be over-complete. In the embodiments of the present invention, the dictionary can be any of the three possible types.

Subband decomposition of images, i.e. splitting an image into multiple channels, is another term used to refer to a forward transform. One or more transform coefficients can be considered as a subband.

The task of sparse approximation is to generate a close representation of x using only a few non-zero weights $\{w_k\}$, hence w is sparse.

In the exemplary thresholding approach, w is found by a forward transform of x and the weights $w_k$ with magnitude below a certain threshold are set to zero. Let A be the forward transform for a dictionary B, i.e.

$w = A \cdot x$.

In case of orthonormal dictionaries like DCT or DFT, the forward transform A is just the transpose of the matrix B. For other dictionaries, there are several approaches to determine a suitable forward transform.

A thresholding operator T is defined that does element wise thresholding, such that, $$T(w_k) = \begin{cases} 0, & w_k < \tau \\ w_k, & w_k \geq \tau \end{cases}.$$

Other forms of thresholding, such as, soft-, firm- or adaptive-thresholding are also possible.

The weights after thresholding are used in the signal expansion to yield an approximated signal a, i.e. $a = B \cdot T(A \cdot x)$. Since the sparse approximation is a part of the overall iterative procedure, we have, $a^{(i)} = B \cdot T(A \cdot x^{(i)})$, during each iteration. The thresholds can be set differently in each iteration. Also, different thresholds can be used for weights corresponding to different dictionary elements.

That is, in other words, the sparsity enforcer 20 may be configured to perform the sparse approximation by sequentially performing a forward transformation, i.e. using A, to obtain transform coefficients w, thresholding the transform coefficients to obtain thresholded transform coefficients, i.e. $T(w_k)$, and performing an inverse transform onto the threshold transform coefficients using B. However, as also described above, the thresholding concept for performing the sparse approximation is merely one possibility among several possibilities. For example, a cost function optimization scheme for performing the sparse approximation may be used instead. For example, the cost function could combine a measure of the number of non-zero transform coefficients or the energy of the transform coefficients and another measure of a dissimilarity between the sparse approximation on the one hand and the inbound signal x to be approximated on the other hand. Alternatively, the sparsity enforcer is configured to perform the sparse approximation by successively building-up the approximated signal by sequentially optimizing coefficients of a parameterized function.

Proceeding with the description of the functionality of the apparatus of FIG. 1, the high frequency portion extractor 30 performs details extraction as follows. It is based on the assumption that the low frequency components in $R^M$ are faithfully upsampled by the filter in U, i.e. by the upsampler 10. Accordingly, these components shall not be altered, rather, the details (high frequency parts) of the approximation $a^{(i)}$ shall be used to refine the upsampled signal. To this end, the low frequency parts of $a^{(i)}$ are estimated and subtracted to yield the signal with details $h^{(i+1)}$.

In an embodiment, the low frequency parts of $a^{(i)}$ are estimated by downsampling it and then upsampling the downsampled signal.

Figure 2:
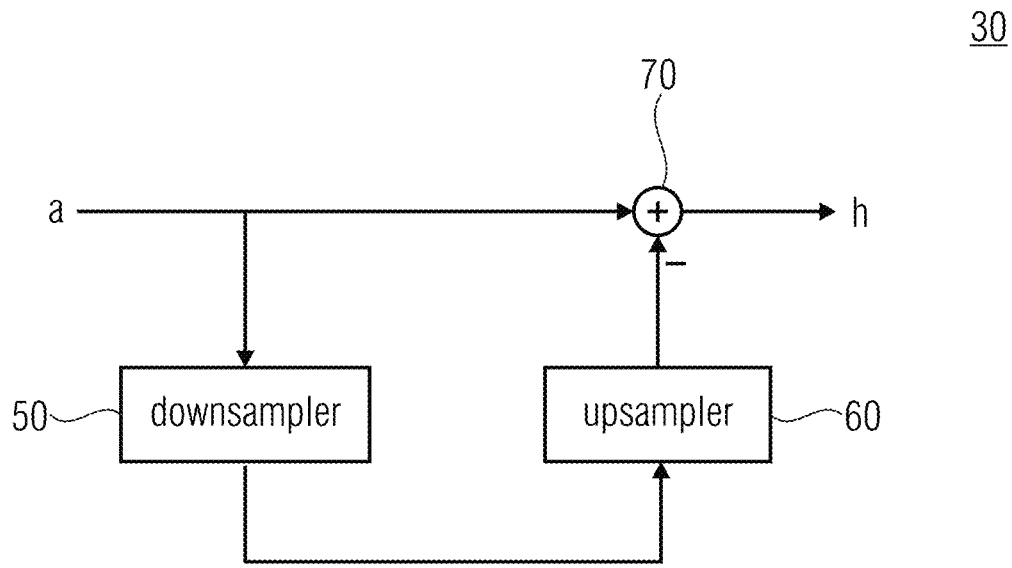
FIG. 2 shows a block diagram of an internal structure of the details extractor or high frequency portion extractor 30 of FIG. 1 in accordance with an embodiment.

To this end, high frequency portion extractor 30 may be implemented as shown in FIG. 2, which shows an example for a corresponding internal structure of the high frequency portion extractor. Between the input of high frequency portion extractor 30 at which signal a enters, and the output of high frequency portion extractor 30 at which signal h is output, a subtractor 70 is connected with its non-inverting input and output, respectively. Between the input at which signal a enters, and the inverting input of subtractor 70, a downsampler 50 and an upsampler 60 are connected in series in the order of their mentioning.

In other words, the signal resulting from downsampling a and then upsampling the downsampled signal, is then subtracted from $a^{(i)}$ to generate the signal with details $h^{(i+1)}$, i.e.

$h^{(i+1)} = a^{(i)} - V \cdot D \cdot a^{(i)}$.

In an embodiment, the upsampler 60, i.e. V, used in the details extraction stage 30 is the same as the upsampler 10, i.e. U, used for initial upsampling described previously. The extracted details, i.e. h, are used to update the estimated HR signal x in the next iteration, $x^{(i+1)} = u + h^{(i+1)}$.

The samples in $x^{(i+1)}$ after the last iteration form the output HR signal.

Figure 3A:
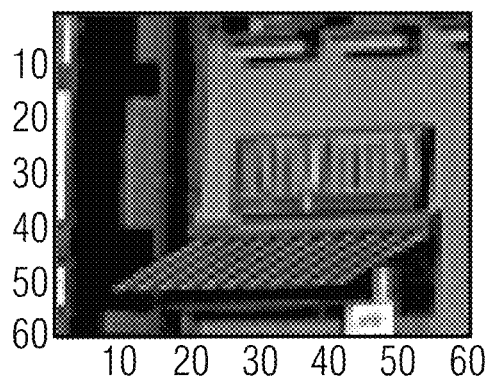
FIGS. 3a-3f show, using an exemplary image example, the image content after consecutive stages in the upsampling procedure according to the example of FIGS. 1 and 2.
Figure 3B:
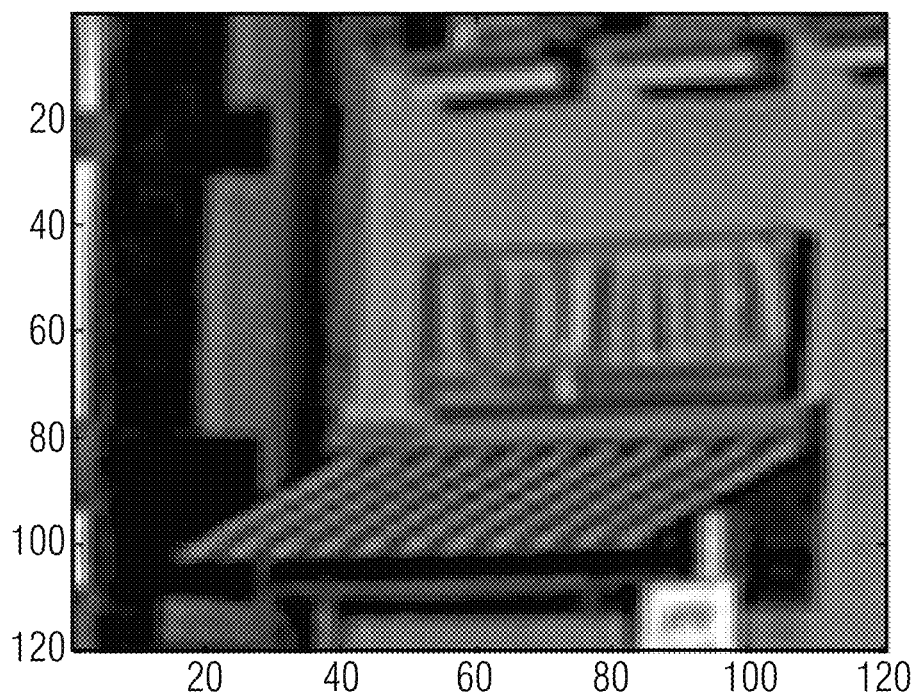
Figure 3C:
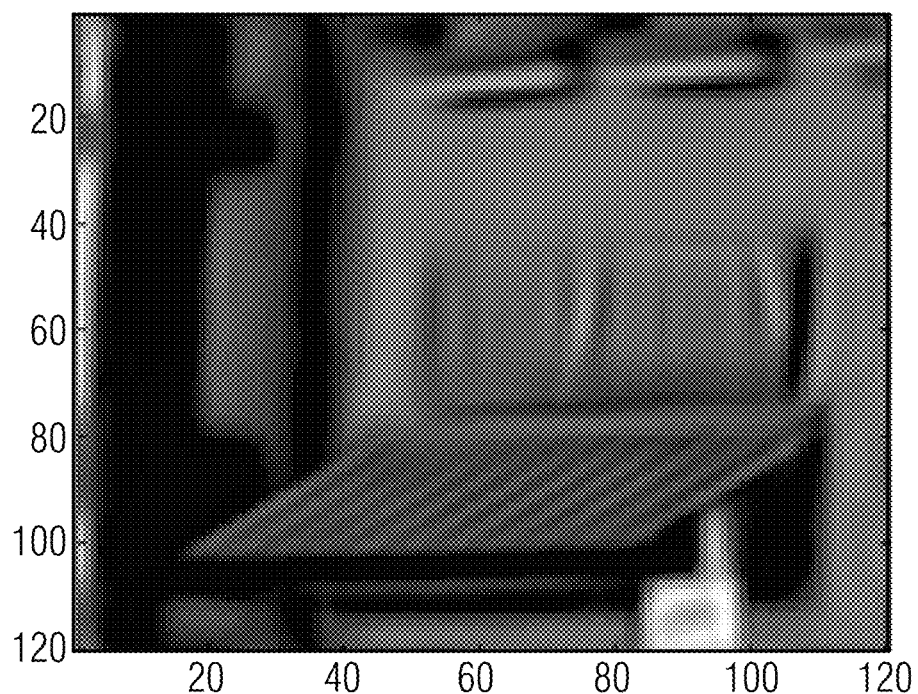

FIGS. 3a-f illustrate the mode of operation of the embodiment described above with reference to an image as an example for signal s. FIG. 3a shows the input LR image s before the upsampling procedure by upsampler 10. It is smaller because of the lower spatial resolution. After upsampling by upsampler 10, the estimated HR image u results, which is shown at increased size compared to the image of FIG. 3a due to the higher number of pixels owing to the upsampling procedure. As described above, u may be obtained by $u = U \cdot s$. After this initial upsampling procedure, the signal currently to be enhanced, i.e. x, is subject to sparse approximation. Remember, x equals u, for example, at the beginning of the first iteration. FIG. 3c shows the result of the sparse approximation of u after the first iteration, i.e. $a^{(0)}$ using 10% non-zero weights in the above identified exemplary threshold embodiment.

Figure 3D:
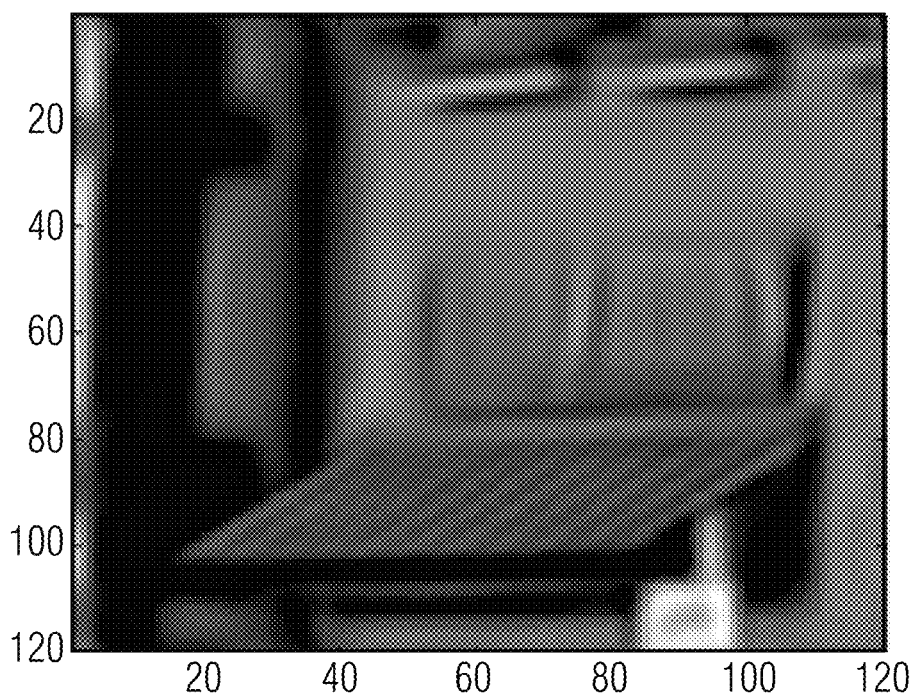
Figure 3E:
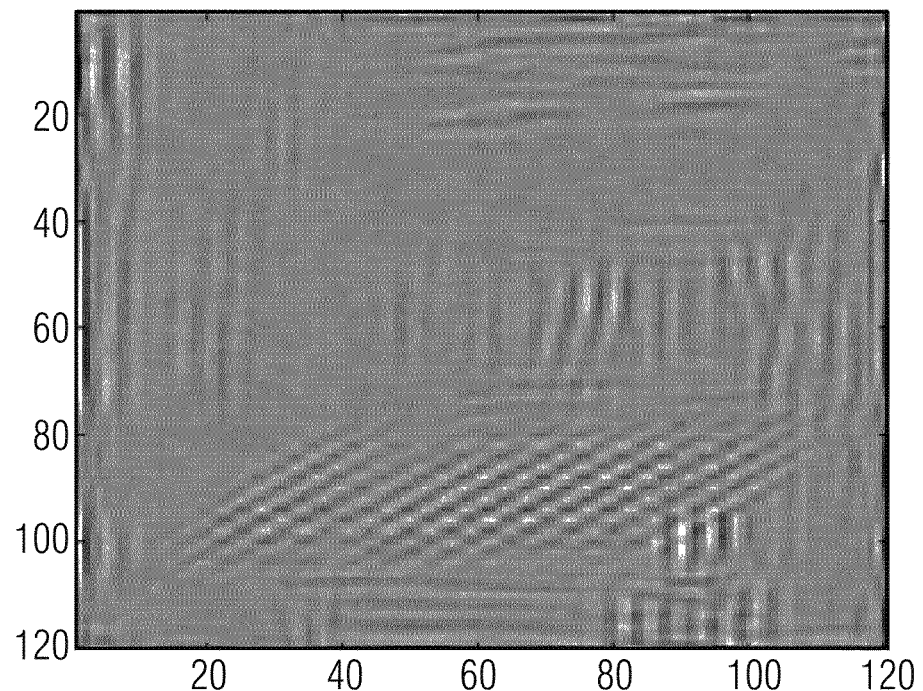
Figure 3F:
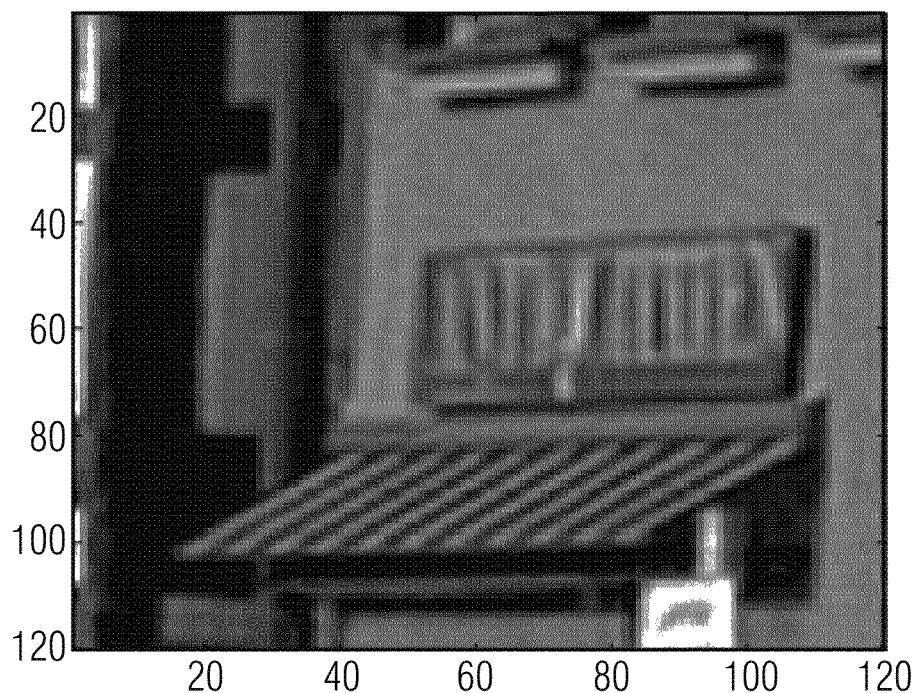

Thereinafter, the sparse approximation, i.e. a, is subject to the high frequency portion extraction or details extraction which, as outlined above, may be implemented by a consecutive application of a downsampling procedure followed by an upsampling procedure, so that the estimated low frequency component of a results. FIG. 3d shows this result for the first iteration using the embodiment of FIG. 2, i.e. $U \cdot D \cdot a^{(0)}$. The subtractor within FIG. 2 then results in the estimated details of $a^{(0)}$, namely the high frequency portion $h^{(1)} = a^{(0)} - U \cdot D \cdot a^{(0)}$. Finally, by combination within combiner 40, signal x is updated and FIG. 3f shows the result after the first iteration, i.e. $x^{(1)} = u + h^{(1)}$. That is, FIG. 3f shows an updated HR image with details and it can be seen that the diagonal lines in the image appear sharper than compared to the initial upsampled result shown in FIG. 3b.

Possible dictionaries for use in the sparse approximation are discussed now. There has been extensive study in constructing and implementing directional transforms aiming at obtaining sparse representations of piece-wise smooth data. The curvelet transform is a directional transform which can be shown to provide optimally sparse approximations of piece-wise smooth images [Candes2004]. However, Curvelets offer limited localization in the spatial domain since they are band-limited. Contourlets are compactly supported directional elements constructed based on directional filter banks [Do2005]. Directional selectivity in this approach is artificially imposed by a special sampling rule of filter banks which often causes artifacts. Moreover, there exists no theoretical guarantee for sparse approximations for piecewise smooth images.

Recently, a novel directional representation system—so called Shearlets—has emerged which provides a unified treatment of continuous as well as discrete models, allowing optimally sparse representations of piecewise smooth images [Kutyniok2011]. One of the distinctive features of Shearlets is that directional selectivity is achieved by shearing in place of rotation; this is, in fact, decisive for a clear link between the continuous and discrete world which stems from the fact that the shear matrix preserves the integer lattice under certain conditions. Furthermore, Shearlets offer a high degree of localization in the spatial domain since they can be compactly supported.

The dictionary can also be generated by training using a set of examples [Aharon2006].

The embodiments discussed so far all concerned signal upsampling. However, the usage of sparse approximation followed by high frequency portion extraction for enhancing a signal to be enhanced may also be transferred onto otherwise obtained signals which, for whatever reason, need to be, or take advantage of being, enhanced. With respect to FIG. 4, an embodiment for signal enhancement, in particular of an apparatus for enhancing an input signal, is discussed. Here, the details synthesis framework discussed above with respect to FIGS. 1 to 3f is used to produce an enhanced version of an input signal, which may be, as discussed above, an input image. The sample resolution of the enhanced signal may the same as the one of the input signal. In case of images, the enhanced image may have the same resolution as the input image.

Figure 4:
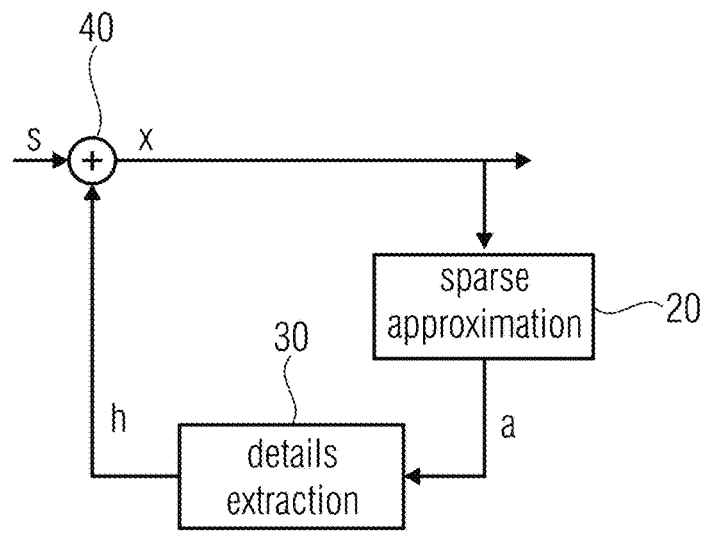
FIG. 4 shows a block diagram of an apparatus for signal enhancement in accordance with an embodiment.

When discussing FIG. 4, it is noted that the same reference signs as those already discussed already in the above figures are reused. This is done because the functionalities of these elements coincide with those already discussed above, and accordingly all of the statements above regarding the functionalities, possible alternatives and implementing same and so forth shall also apply to the embodiment of FIG. 4 discussed now.

That is, FIG. 4 shows an apparatus for enhancing an input signal s which comprises a sparsity enforcer 20, a high frequency portion extractor 30 and a combiner 40 which are, in the order of their mentioning, connected into a loop between an output and a first input of combiner 40, wherein a second input of combiner 40 receives the inbound signal s. The output of combiner 40 concurrently forms the output of the apparatus of FIG. 4.

As can clearly be seen by comparing FIGS. 1 and 4, the apparatus of FIG. 4 may in fact be one component of the upsampling apparatus 5 of FIG. 1, with the initially upsampled signal u representing the signal to be enhanced s in the case of FIG. 4. In other words, in FIG. 4 the initial upsampler 10 is not employed. Just as it was the case in FIG. 1, FIG. 4 also uses an iterative mode of operation in enhancing the inbound signal. In the case of FIG. 4, a high pass filter may be used for realizing the details extractor or high pass portion extractor 30.

In the video coding context, for example, the signal enhancement performed by the apparatus of FIG. 4 may, for example, be used so as to realize a details synthesis. Such a details synthesis may, for example, be applied after the DPCM reconstruction stage of a hybrid video codec such as, for example, H.264 or HEVC, as a loop filter or post-filter, for example.

Some general notes for the above embodiments are provided now.

Figure 5:
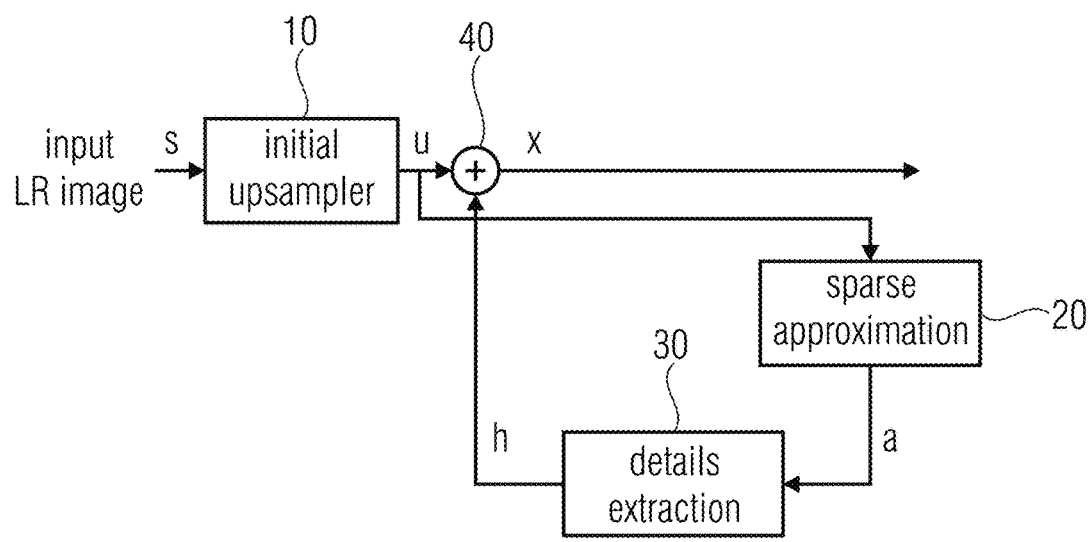
FIG. 5 shows a non-iteratively operating apparatus for upsampling in accordance with an alternative embodiment.

With regard to the upsampling concept, for example, it is noted that, other than as outlined in the above sections, the details synthesis processing does not have to operate iteratively. In other words, merely one iteration may suffice. The loop construction may then be left off as illustrated in FIG. 5, which thus shows an alternative embodiment for an upsampling apparatus. Again, a corresponding signal enhancement apparatus, i.e. an alternative to the embodiment of FIG. 4, may be obtained by leaving off the initial upsampler 10 so that the inbound signal of the signal enhancement apparatus gets s directly.

Moreover, the sparse approximation used by the sparsity enforcer 20 does not necessarily operate on the second signal, i.e. u, obtained by the upsampler 10 in order to obtain the approximated signal a, which approximates this second signal. Rather, according to an alternative, the sparsity enforcer 20 could be configured to operate onto the first signal directly. For example, in the iterative configuration shown in FIG. 1, the sparse approximator 20 could use the initial signal s as its input at least as far as the first iteration is concerned. Thus, in the case of using an iterative implementation of the upsampling process as shown in FIG. 1, the sparse approximation performed by sparse approximator 20 may, for example, be performed on the first signal s directly in the first iteration, while using the outcome of the combination, i.e. the combined/updated signal x in the following iteration(s). For applying the sparse approximation onto the first signal directly, the sparsity enforcer 20 may, for example, use a different upsampling process than compared to upsampler 10 in order to upsample the first signal to the second resolution. Alternatively, the sparsity enforcer may modify the forward transform, i.e. A, so as to transition from the first resolution to the second resolution such as by using interpolated versions of the base functions of the dictionary. Further, please note that the pure addition of the second signal and the approximated signal is merely an example and may be modified.

Similarly, with regard to the enhancement concept it is noted that, other than outlined in the above sections, the enhancing processing does not necessary operate iteratively. In other words, merely one iteration may suffice. Further, please note that the pure addition of the second signal and the approximated signal is merely an example and may be modified.

It has already been outlined above that the above embodiments may be applied not only on one-dimensionally sampled signals but on two-dimensionally sampled signals as well, such as images, like still pictures or frames of videos. If applied to pictures/images, the initial upsampler 10 may be embodied, as outlined above, as a FIR filter, IIR filter or the like, and this filter may operate, for example, two-dimensionally or sequentially by filtering the inbound signal first along one direction and then into another direction, transverse to the first, such as row-wise followed by column-wise or vice versa. Similarly, the sparse approximation performed by sparse approximator 20 may operate two-dimensionally or as a concatenation of one dimensional sparse approximations, such as first of all row-wise and second column-wise or vice versa. Imagine, for example, the above outlined thresholding implementation of the sparse approximation: in that case, forward and backward transforms A and B may be one dimensional transforms applied onto column portions of the image first, and then row-wise secondly, or vice versa. Theoretically, the switching between performing the sparse approximation along one direction and performing the sparse approximation along the other direction, could be performed within one iteration, i.e. both in front of the high frequency portion extraction, or from iteration to iteration.

Initial upsampling, sparse approximation, details extraction and combination could alternatively all be performed along one axis first with then performing this processing again for a transverse axis, such as row-wise first with then column-wise and vice versa. A M×N image s would thus firstly be upsampled to an enhanced upsampled image x of size 2M×N having been upsampled along the row axis, i.e. for each row, and then the enhanced upsampled image x of size 2M×N would be applied to the enhanced upsampling process according to any of the embodiments outlined above along the column axis, i.e. for each column, so that an two-dimensionally upsampled image 2M×2N results. Thus, the upsampling apparatus would upsample a two-dimensional signal by sequentially appointing one of rows or columns of the two-dimensional signal the first signal with performing the upsampling of this first signal so as to obtain a one-dimensionally upsampled two-dimensional signal. Then, subsequently, the upsampling apparatus would appoint the other of rows and columns of the one-dimensionally upsampled two-dimensional signal the first signal with performing the upsampling of this first signal.

As has also already been noted above, the sparse approximation may be applied onto the current signal version x locally or globally. That is, in case of the sparse approximation thresholding implementation, forward and backward transforms may be applied onto the image locally with shifting the transform windows across the image so as to cover the complete image, or globally.

Figure 6A:
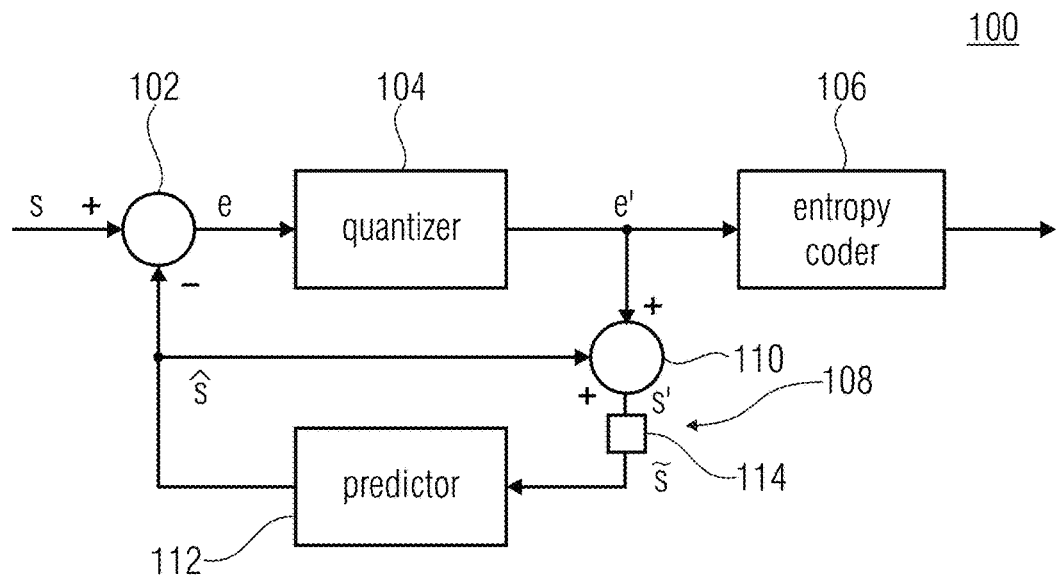
FIGS. 6a-6b show block diagrams of a hybrid video encoder and hybrid video decoder, respectively, where the apparatus for signal enhancement may be used as an in-loop filter.
Figure 6B:
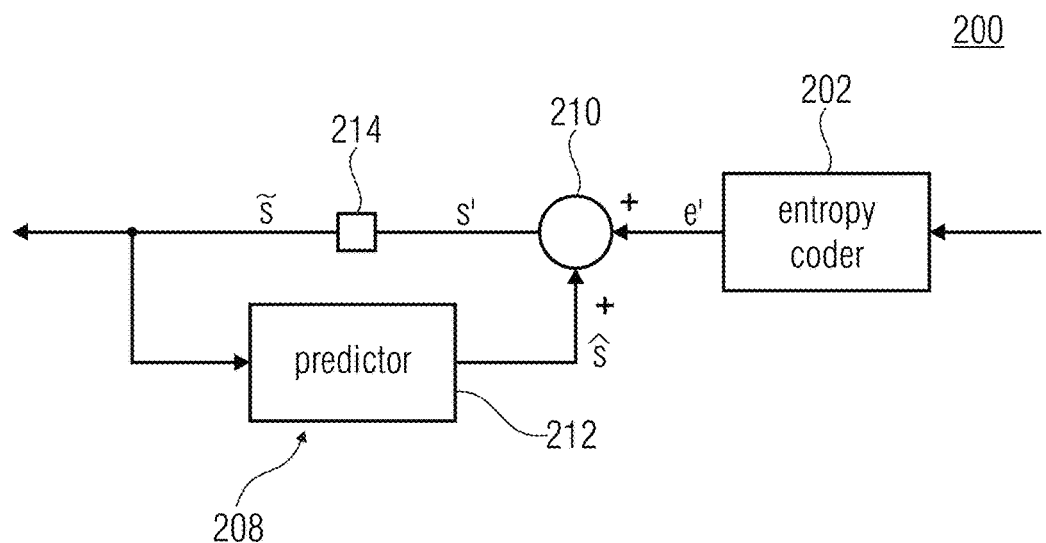

For the sake of completeness, FIGS. 6a and 6b show examples for a hybrid video encoder 100 and the hybrid video decoder 200, respectively, so as to illustrate the above-identified possibility of using the signal enhancement apparatus of FIG. 4 in such a hybrid video codec of the DPCM (differential pulse code modulation) type. FIGS. 6a and 6b show the typical structure of such a hybrid video encoder/decoder: The encoder 100 comprises a subtractor 102, a quantizer 104 and an entropy coder 106 serially connected, in the order of their mentioning, between a video input at which signal s enters, and a video output at which the video data stream is output. At the other, inverting input of subtractor 102 a prediction signal ŝ is applied, which is obtained, for example, using several prediction modes comprising, for example, spatial and/or temporal prediction mode. Thus, at the output of subtractor 102, the residual signal e results, i.e. the prediction residual which is subject to quantization by quantizer 104. Although not shown, quantizer 104 may perform the quantization in the spectral domain by subjecting the residual signal e to a spectral transform prior to quantization. The remaining residual signal e', which differs from the original residual signal e due to quantization, is then losslessly coded by entropy coder 106 into the video data stream. Thus, residual signal e' is available at the decoder as well and is input into a prediction loop 108 of encoder 100 comprising a serial connection of a combiner 110, an in-loop filter 114, and a predictor 112, which are connected in series to each other in the order of their mentioning so that a first input of combiner 110 receives residual signal e' and another input thereof receives the prediction signal ŝ so that combiner 110, by addition, computes DPCM reconstructed signal s'. The in-loop filter 114 improves the DPCM reconstructed signal s' to result in the final reconstructed signal š. This final signal š may optionally be stored in a picture buffer and acts as reference for subsequent predictions, hence the name reference signal.

Predictor 112 performs the prediction, i.e. obtains ŝ, on the basis of this reference signal š and uses, to this end, as just mentioned, spatial and/or temporal prediction, for example. The in-loop filter 114, thus, improves the prediction source and may, as outlined above, comprise the signal enhancement apparatus of FIG. 4.

A corresponding hybrid video decoder 200 may be construed as shown in FIG. 6b: an entropy decoder 202 may receive the video data stream at its input so as to output residual signal e', which in turn is received by a prediction loop 210 of decoder 200 constructed in line with the prediction loop 108 of the encoder 100. Prediction loop 208 comprises a combiner 210, an in-loop filter 214 and a predictor 212 so that a first input of combiner 210 receives the prediction signal ŝ at a first input thereof and the residual signal e' at a second input thereof, wherein the signal s' at the output of combiner 210 constitutes the DPCM reconstructed signal. The signal s' passes through the in-loop filter 214, which behaves like 114 in FIG. 6a, and may, accordingly, comprise the signal enhancement apparatus of FIG. 4, to result in the decoder output signal š. As outlined above, this final signal s may optionally be stored in a picture buffer and acts as reference for subsequent predictions, hence the name reference signal. Predictor 212 performs the prediction on the basis of this reference signal š and redoes the predictions of predictor 112, i.e. uses spatial and/or temporal prediction, for example, thereby resulting in prediction signal ŝ.

Figure 7A:
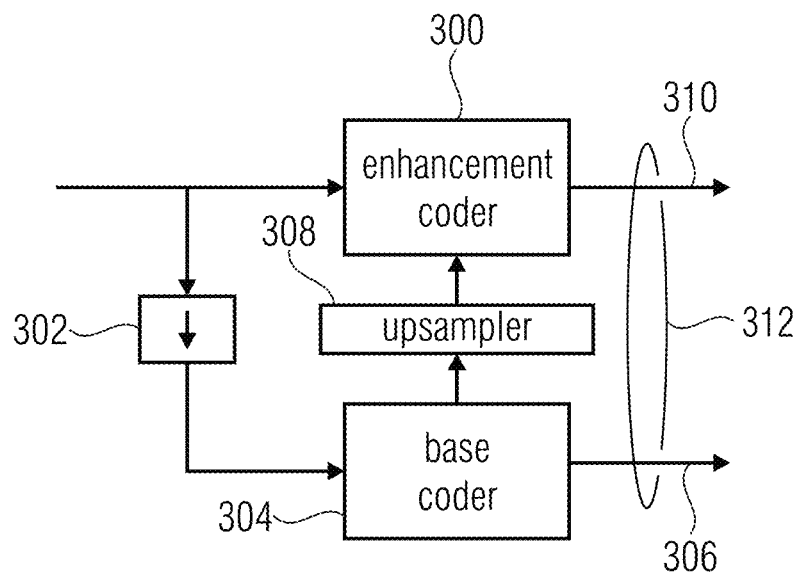
FIGS. 7a-7b show video encoder/decoder, respectively, supporting spatial scalability where the upsampling apparatus in accordance with the present application may be used so as to provide the inter-layer prediction source.
Figure 7B:
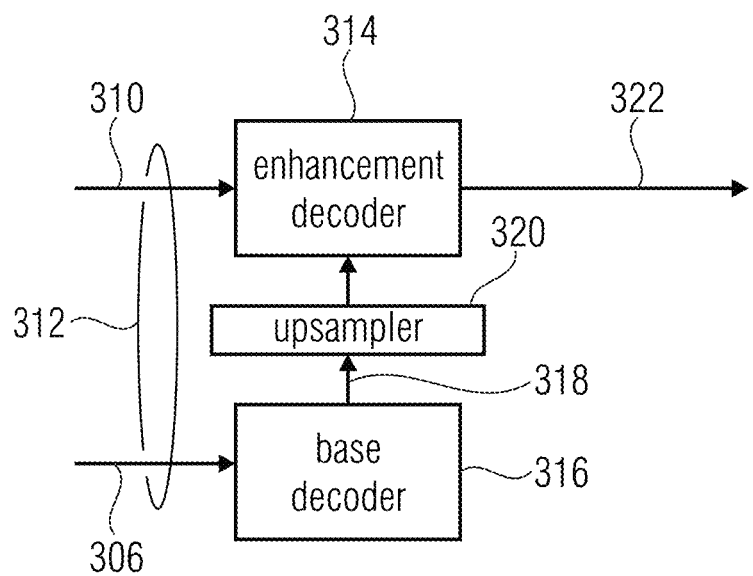

For the sake of completeness, FIGS. 7a and 7b show that the upsampling apparatus of FIG. 1 or FIG. 5 or any of the other above outlined upsampling embodiments, may be used in a video codec supporting spatial scalability. FIG. 7a shows a video coder at which a video enters and directly reaches an enhancement coder 300, and indirectly, via a downsampler 302, a base coder 304. The base coder 304 codes using, for example, hybrid video coding as outlined above with respect to FIGS. 6a and 6b, the downsampled video into a base data stream 306. The enhancement coder 300 operates on the original video, not having been downsampled, but for inter-layer redundancy reduction the enhancement coder 300 uses the reconstruction of the downsampled video as obtainable from base layer data stream 306. To this end, an upsampler 308 up-samples the reconstructed base layer signal and provides the upsampled signal as an inter-layer prediction source to enhancement coder 300, which in turn uses inter-layer prediction so as to predictively code the video having higher spatial resolution more efficiently. The upsampler 308 may be embodied as described above, such as shown in FIG. 1 or 5, respectively. The enhancement coder 300 codes the inter-layer prediction residual into an enhancement layer data stream 310, with both enhancement layer data stream 310 and base layer data stream 306 forming a scalable data stream 312. FIG. 7b shows a corresponding video decoder which receives the video data stream 312 composed of the base layer data stream 306 and the enhancement layer data stream 310 and comprises an enhancement decoder 314 and a base decoder 316. The base decoder 316 uses the base layer data stream 306 so as to reconstruct the lower spatial resolution video 318 which is upsampled by an upsampler 320 so as to form the prediction source for inter-layer prediction by enhancement decoder 314, which in turn reconstructs the high spatial resolution video by using inter-layer prediction using the prediction source provided by upsampler 320 and the enhancement layer data stream 310, respectively. Upsampler 320 and upsampler 308 are the same, that is, upsampler 320 may be embodied as outlined above with respect to FIG. 1 or FIG. 5 or any of the other examples of an upsampling apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

Pat. No. Title

U.S. Pat. No. 8,290,251 Image stylization using sparse representation
U.S. Pat. No. 8,165,215 System and method for designing of dictionaries for sparse representation
U.S. Pat. No. 7,526,123 Estimating facial pose from a sparse representation
U.S. Pat. No. 7,401,006 Method and system for signal processing using a sparse approximation of the S-transform
U.S. Pat. No. 8,369,653 System and method for image upsampling using natural image statistics of first and second derivatives
U.S. Pat. No. 8,260,087 Image upsampling technique
U.S. Pat. No. 8,233,734 Image upsampling with training images
[Shannon1949] C. E. Shannon, "Communication in the presence of noise," Proc. Institute of Radio Engineers, vol. 37, no. 1, pp. 10-21, January 1949.
[Unser2000] M. Unser, "Sampling—50 Years After Shannon", Proc. IEEE, vol. 88, no. 4, pp. 569-587, April 2000.
[Unser1999] M. Unser, "Splines: A Perfect Fit for Signal and Image Processing", IEEE Signal Proc. Magazine, vol. 16, no. 6, pp. 22-38, November 1999.
[Blu2001] T. Blu, P. Thevenaz and M. Unser, "MOMS: Maximal-Order Interpolation of Minimal Support", IEEE Trans. On Image Proc., vol. 10, no. 7, July 2001.
[Li2001] X. Li and M. T. Orchard, "New edge-directed interpolation." IEEE Trans. on Image Proc., 10(10):1521-1527, 2001.
[Irani1991] M. Irani and S. Peleg, "Improving resolution by image registration," Graphical Models and Image Processing, 53:231-239, 1991.

[Olshausen1996] B. A. Olshausen and D. J. Field, "Natural image statistics and efficient coding," Network: Computation in Neural Systems, no. 7, pp. 333-339, 1996.

[Mallat1993] S. G. Mallat, "Matching pursuits with time-frequency dictionaries," IEEE Trans. On. Signal Proc., Vol 41, no. 12. Pp. 3397-3415, December 1993.

[Chen1998] S. S. Chen, D. L. Donoho, M. A. Saunders, "Atomic Decomposition by Basis Pursuit," SIAM Journal on Scientific Computing, Vol. 20, no. 1, 1998

[Blumensath2008] T. Blumensath, M. E. Davies, "Iterative Thresholding for Sparse Approximations", The Journal of Fourier Analysis and Applications, vol. 14, no 5, pp. 629-654, December 2008.

[Kutyniok2011] G. Kutyniok and W.-Q Lim "Compactly Supported Shearlets are Optimally Sparse", J. Approx. Theory, Vol. 163, pp. 1564-1589, 2011.

[Candes2004] E. J. Candes and D. L. Donoho, "New tight frames of curvelets and optimal representations of objects with C2 singularities," Comm. Pure Appl. Math., vol. 57, no 2, pp. 219-266, 2004.

[Do2005] M. N. Do and M. Vetterli, "The contourlet transform: an efficient directional multiresolution image representation," IEEE Trans. on Image Proc., vol. 14, no. 12, December 2005.

[Aharon2006] M. Aharon, M. Elad and A. M. Bruckstein, "The K-SVD: An Algorithm for Designing of Overcomplete Dictionaries for Sparse Representation," IEEE Trans. On Signal Proc., vol. 54, no. 11, pp. 4311-4322, November 2006.

The invention claimed is:

1. An apparatus for upsampling a first signal comprising a first resolution, the apparatus comprising a processor or electronic circuit configured to
apply an upsampling process onto the first signal so as to acquire a second signal comprising a second resolution higher than the first resolution;
generate, using sparse approximation, an approximated signal approximating the second signal and comprising the second resolution;
extract a high frequency portion from the approximated signal
using a high pass filter or
by estimating a low frequency portion of the approximated signal and subtracting the low frequency portion from the approximated signal; and
combine the second signal and the extracted high frequency portion.

2. The apparatus according to claim 1, wherein the processor or electronic circuit is configured to perform the upsampling process using a FIR filter, II R filter, or a combination of both.

3. The apparatus according to claim 1, wherein the processor or electronic circuit is configured to generate the approximated signal by applying a sparse approximation to the second signal.

4. The apparatus according to claim 1, wherein the processor or electronic circuit is configured to perform the sparse approximation by sequentially performing a forward transformation to acquire transform coefficients, thresholding the transform coefficients to acquire thresholded transform coefficients and performing an inverse transform onto the thresholded transform coefficients.

5. The apparatus according to claim 1, wherein the processor or electronic circuit is configured to perform the sparse approximation by optimizing a cost function.

6. The apparatus according to claim 1, wherein the processor or electronic circuit is configured to perform the sparse approximation by successively building-up the approximated signal by sequentially optimizing coefficients of a parameterized function.

7. The apparatus according to claim 1, wherein the processor or electronic circuit is configured to estimate the low frequency portion by downsampling and then upsampling the approximated signal.

8. The apparatus according to claim 7, wherein the processor or electronic circuit is configured to, in upsampling the downsampled approximated signal, use the upsampling process of the upsampler.

9. The apparatus according to claim 1, wherein the processor or electronic circuit is configured to, in combining the second signal and the high frequency portion of the approximated signal, add same to one another.

10. The apparatus according to claim 1, when the processor or electronic circuit is configured to perform the generation, the extraction and the combination iteratively in iterations with the sparse approximation being applied onto a combined signal acquired by the combination.

11. The apparatus according to claim 1, wherein the first signal, the second signal and the approximated signal are two-dimensional signals.

12. The apparatus according to claim 1, wherein the processor or electronic circuit is configured to upsample a two-dimensional signal by using a series of one-dimensional row-wise and column-wise upsampling steps.

13. An apparatus for enhancing an input signal, the apparatus comprising a processor or electronic circuit configured to
generate, using sparse approximation, an approximated signal approximating the input signal;
extract a high frequency portion from the approximated signal
using a high pass filter or
estimating a low frequency portion of the approximated signal and subtracting the low frequency portion from the approximated signal; and
combine the input signal and the extracted high frequency portion extracted from the approximated signal.

14. The apparatus according to claim 13, wherein the processor or electronic circuit is configured to generate the approximated signal by applying a sparse approximation to the input signal.

15. The apparatus according to claim 13, wherein the processor or electronic circuit is configured to perform the sparse approximation by sequentially performing a forward transformation to acquire transform coefficients, thresholding the transform coefficients to acquire thresholded transform coefficients and performing an inverse transform onto the thresholded transform coefficients.

16. The apparatus according to claim 13, wherein the processor or electronic circuit is configured to perform the sparse approximation by optimizing a cost function.

17. The apparatus according to claim 13, wherein the processor or electronic circuit is configured to perform the sparse approximation by successively building-up the approximated signal by sequentially optimizing coefficients of a parameterized function.

18. The apparatus according to claim 13, wherein the processor or electronic circuit is configured to estimate the low frequency portion by downsampling and then upsampling the approximated signal.

19. The apparatus according to claim 13, wherein the processor or electronic circuit is configured to, in combining the input signal and the high frequency portion of the approximated signal, add same to one another.

20. The apparatus according to claim 13, when the processor or electronic circuit is configured to perform the generation, the extraction and the combination iteratively in iterations with the sparse approximation applied onto a combined signal acquired by the combination.

21. The apparatus according to claim 13, wherein the input signal and the approximated signal are two-dimensional signals.

22. The apparatus according to claim 13, wherein the processor or electronic circuit is configured to enhance a two-dimensional signal by using a series of one-dimensional row-wise and column-wise upsampling steps.

23. A method for upsampling a first signal comprising a first resolution, comprising applying an upsampling process onto the first signal so as to acquire a second signal comprising a second resolution higher than the first resolution;

generating, using sparse approximation, an approximated signal approximating the second signal and comprising the second resolution;

extracting a high frequency portion from the approximated signal using a high pass filter or by estimating a low frequency portion of the approximated signal and subtracting the low frequency portion from the approximated signal; and combining the second signal and the extracted high frequency portion.

24. A method for enhancing an input signal, comprising generating, using sparse approximation, an approximated signal approximating the input signal;

extracting a high frequency portion from the approximated signal using a high pass filter or by estimating a low frequency portion of the approximated signal and subtracting the low frequency portion from the approximated signal; and combining the input signal and the extracted high frequency portion extracted from the approximated signal.

25. A non-transitory computer readable medium storing a computer program or computer program product for performing, when executed on a computer, a method according to claim 23.

26. A non-transitory computer readable medium storing a computer program or computer program product for performing, when executed on a computer, a method according to claim 24.

* * * * *

UNITED STATES PATENT AND TRADEMARK OFFICE
CERTIFICATE OF CORRECTION

PATENT NO. : 9,830,682 B2  
APPLICATION NO. : 14/922797  
DATED : November 28, 2017  
INVENTOR(S) : Haricharan Lakshman et al.

It is certified that error appears in the above-identified patent and that said Letters Patent is hereby corrected as shown below:

(72) Inventors:  
Please change "Lim Wang-Q, Osnabrueck (DE)"  
To read: --Wang-Q Lim, Osnabrueck (DE)--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*